United States Patent

Prinzhausen et al.

[11] Patent Number: 5,341,211
[45] Date of Patent: Aug. 23, 1994

[54] APPARATUS FOR MAKING ABSOLUTE TWO-DEMENSIONAL POSITION MEASUREMENTS

[75] Inventors: Friedrich Prinzhausen, Stuttgart; Pawel Drabarek, Ditzingen, both of Fed. Rep. of Germany

[73] Assignee: Robert Bosch GmbH, Stuttgart, Fed. Rep. of Germany

[21] Appl. No.: 838,735

[22] PCT Filed: Sep. 7, 1990

[86] PCT No.: PCT/DE90/00684
 § 371 Date: Mar. 12, 1992
 § 102(e) Date: Mar. 12, 1992

[87] PCT Pub. No.: WO91/04460
 PCT Pub. Date: Apr. 4, 1991

[30] Foreign Application Priority Data
 Sep. 13, 1989 [DE] Fed. Rep. of Germany ....... 3930554

[51] Int. Cl.⁵ .............................. G01B 11/02
[52] U.S. Cl. ................... 356/357; 356/356; 356/358; 359/1; 359/15; 250/572; 250/237 G
[58] Field of Search ............... 356/356, 357, 358, 348, 356/347; 359/1, 15, 564; 250/572, 237 G, 231.18

[56] References Cited

U.S. PATENT DOCUMENTS 4,930,895  6/1990  Nishimura et al. ............... 356/356
5,141,317  8/1992  Bollhagen et al. ............... 356/356

FOREIGN PATENT DOCUMENTS 1912162  6/1972  Fed. Rep. of Germany.
2236489  2/1973  Fed. Rep. of Germany.
2312203  8/1974  Fed. Rep. of Germany.
3704313  6/1988  Fed. Rep. of Germany.
3821046  12/1989 Fed. Rep. of Germany.

*Primary Examiner*—Davis L. Willis
*Assistant Examiner*—LaClarks Keesee
*Attorney, Agent, or Firm*—Spencer, Frank & Schneider

[57] ABSTRACT

An apparatus is proposed for making absolute, two-dimensional measurements of the position of an object (10) with reference to a measuring arrangement (11), with the surface of the object (10) being configured as a hologram. The information contained in the hologram is red out by means of a measuring wave (13) that is directed onto the hologram (18), is diffracted there and interferes with a reference wave (14). The interfered-with waves (13, 14) are picked up by an optical sensor arrangement (20) including at least two sensors (21, 22). In a signal processing arrangement (23), the absolute position is determined either from the radiation intensities picked up by the sensors (21, 22) or from the phase relationship between the signals emitted by the sensors (21, 22), in each case by a comparison with a value stored in a memory.

15 Claims, 1 Drawing Sheet

APPARATUS FOR MAKING ABSOLUTE TWO-DEMENSIONAL POSITION MEASUREMENTS

STATE OF THE ART

The invention relates to an apparatus for making absolute two-dimensional measurements of the position of an object relative to a measuring arrangement.

German Patent Application DE-P 3,821,046 discloses a method of measuring travel and/or angles by optoelectronic means in which a first and a second optical beam are directed at predetermined angles onto the surface of an object to be measured and are diffracted on the surface at a common point of incidence. Both beams either have different frequencies or the frequency of the two beams changes simultaneously, with one of the beams being modulated in phase. The change in phase of the signal emitted by an optical sensor relative to a reference signal is evaluated. Diffraction takes place at the point of incidence of the two beams on the surface of the object to be measured because the surface always has a certain roughness which has the effect of an optical grating. The prior art method is able to perform an absolute position measurement if, at a certain measuring moment, for example at the beginning of the measurement, a reference position is defined. However, an absolute measurement of the position of the object to be measured relative to the measuring arrangement on the basis of the just compiled measured values is not possible.

It is the object of the invention to provide an apparatus for making two-dimensional measurements of the position of an object relative to a measuring arrangement so as to permit an absolute position measurement to be made from the just obtained measured values.

SUMMARY OF THE INVENTION

The above object is generally achieved according to the present invention by an apparatus for making absolute, two-dimensional measurements of the position of an object with reference to a measuring arrangement wherein an optical measuring wave is directed onto a surface of the object, with the surface being configured as a hologram and an optical reference wave is provided for interfering with the measuring wave diffracted by the hologram, an optical sensor arrangement comprising at least two sensors is provided for detecting the interfered-with waves, and a signal processing arrangement determines the position of the object from the output signals of the sensors and from a value stored in a memory.

ADVANTAGES OF THE INVENTION

The basic apparatus according to the invention as described above exhibits very high resolution at relatively little expense. The configuration of at least one surface of the object to be measured as a hologram permits the accommodation of a great information density which is evaluated by the simply configured optical measuring arrangement.

The information contained in the hologram is evaluated in that a measuring wave is directed onto the hologram and a reference wave is provided to interfere with the measuring wave diffracted by the hologram. The interfered-with waves are picked up by a sensor arrangement including at least two sensors whose output signals are fed to a signal processing arrangement which determines from these signals and from values stored in a memory the absolute, two-dimensional position of the object with reference to the measuring arrangement.

According to a first embodiment of the apparatus according to the invention the signal processing arrangement determines the absolute position from the sensor output signals which are proportional to the intensity of the interfered-with waves, for example by difference or quotient formation from the signals emitted by the at least two sensors. The significant advantage of this embodiment is the simple configuration of the optical arrangement because the measuring wave and the reference wave can both have the same frequency.

In a second embodiment it is provided that the signal processing arrangement determines the absolute position from the phase relationships between the output signals emitted by the at least two sensors. In this embodiment it is necessary that a phase or frequency modulation occurs between the measuring wave and the reference wave. The modulation permits evaluation of the phase relationships at a frequency which is very low compared to the optical frequency of the measuring and reference waves and which can be evaluated by means of a very simple electronic arrangement. This embodiment has the particular advantage that the intensities of measuring wave and reference wave are not included in the result of the absolute position measurement. Consequently, a greater measuring accuracy and/or resolution is attained.

An advantageous feature of the apparatus according to the invention provides that the measuring and reference waves are directed from different directions onto a common point of incidence on the hologram. Adjustment of the optical arrangement in this configuration is easy. It merely need be ensured that the measuring wave as well as the reference wave are directed onto the common point of incidence. Adjustment of the optical sensor arrangement is particularly simple. It merely need be ensured that the interfered-with waves which are diffracted at the point of incidence impinge on the sensors. Small dimensions for the optical measuring arrangement are possible due to the use of a semiconductor laser as the radiation source, with the optical configuration preferably being effected in integrated form.

A further increase in resolution and measuring accuracy is possible if the optical sensor arrangement is configured as an array or as a two-dimensional multi-sensor arrangement. In this configuration of the optical sensor arrangement, the output signals of several sensors are evaluated in each case.

According to an advantageous modification of the apparatus according to the invention, at least one further measuring wave and reference wave are provided in each case which have a different wavelength compared to the already existing waves.

In a first embodiment of the modification, two further sensors are also provided in the sensor arrangement, with both sensor groups each detecting one wavelength of the interfered-with waves. The division of the optical measuring arrangement into two parts of different wavelengths permits simple realization of the hologram because, for example, the one wavelength can be associated with the one dimension and the other wavelength can be associated with the other dimension. The calculation and generation of the hologram then becomes particularly simple.

As a further feature of the modification it is provided that the different wavelengths are generated alternatingly in time. The low cost of the sensor arrangement is a particular advantage since it requires only two sensors and the signal processing arrangement is able to make the association with the different wavelength with the aid of a signal supplied to it for this purpose.

Further improvements and modifications of the apparatus according to the invention will become evident from further dependent claims in conjunction with the description that follows.

DETAILED DESCRIPTION OF THE PREFERRED EMBODIMENTS

Figure 1:
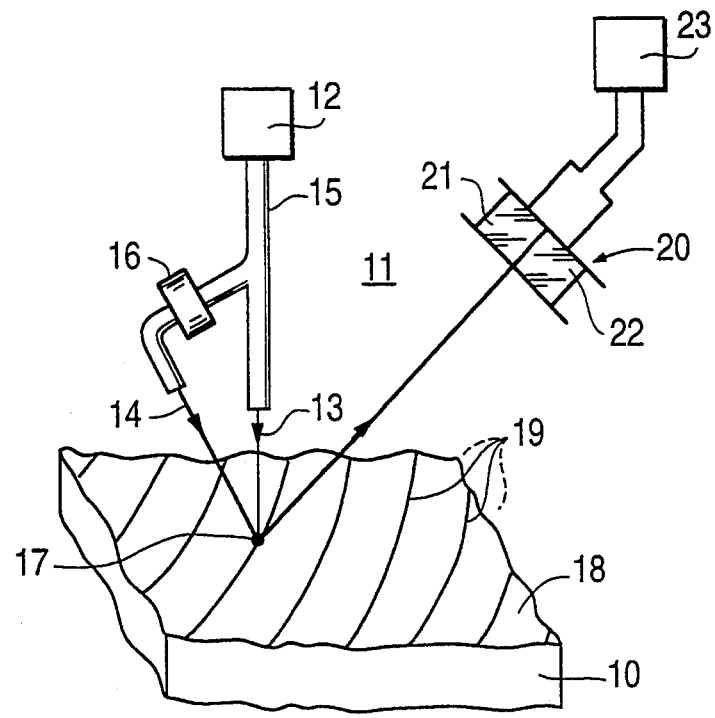
FIGS. 1 and 2 depict two embodiments of an apparatus for making absolute, two-dimensional position measurements according to the invention.

FIG. 1 shows an object 10 whose absolute, two-dimensional position with reference to a measuring arrangement 11 is measured. The optical measuring arrangement 11 includes a radiation source 12 from whose radiation a measuring wave 13 and a reference wave 14 are derived. The measuring wave 13 as well as the reference wave 14 are conducted through a light waveguide 15. A modulator 16 is disposed in the beam path of the reference wave. The measuring wave 13 and the reference wave 14 are directed onto a common point of incidence 17 on the surface 18 on object 10, with the surface being configured as a hologram. The structure of the hologram is indicated by lines 19. The waves 13 and 14 diffracted at point of incidence 17 interfere with one another and are detected by an optical sensor arrangement 20 which includes at least two sensors 21 and 22. The output signals of sensors 21 and 22 are fed to a signal processing arrangement 23 which determines the position.

Figure 2:
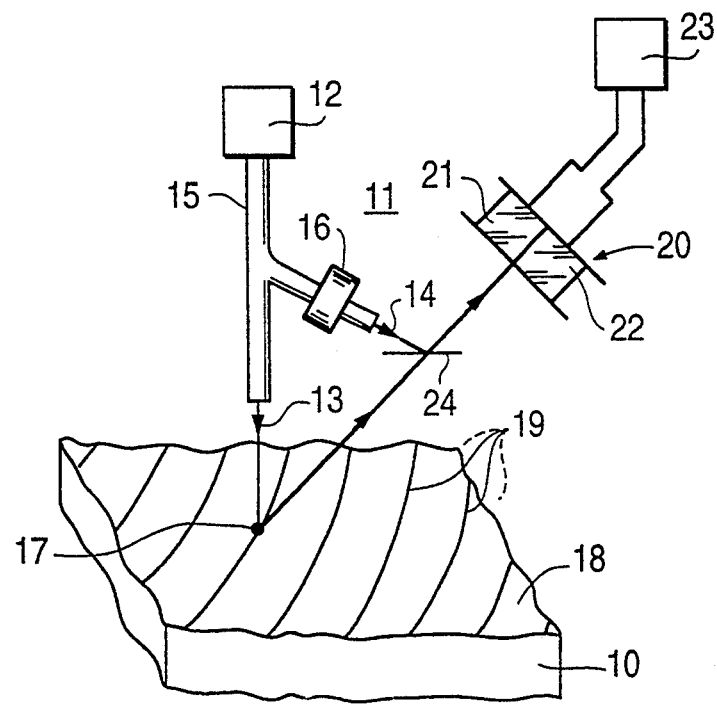

FIG. 2 shows an alternative configuration of the beam path of the apparatus shown in FIG. 1. The components that coincide with those shown in FIG. 1 bear the same reference numerals in FIG. 2 as in FIG. 1. Reference wave 14 is brought to be superposed on measuring wave 13 at a point which lies between sensor arrangement 20 and hologram 18. A beam divider 24 is provided to combine the two waves 13 and 14.

The apparatuses according to the invention shown in FIGS. 1 and 2 operate as follows:

The information regarding the absolute two-dimensional position of object 10 with reference to the optical measuring arrangement 11 is contained in the surface 18 of object 10, with the surface being configured as a hologram. The hologram may also be produced separately and may then be connected with the surface of object 10. The structure of the hologram 18 can be calculated theoretically and is much more complicated in practice than sketched in simplified form as lines 19. The information contained in hologram 18 is read out by optical means. The measuring wave 13 directed onto hologram 18 is diffracted at point of incidence 17. The position information is contained in the phase position of the diffracted wave and is evaluated relative to reference wave 14 which, for this purpose, is caused to interfere with measuring wave 13. According to FIG. 1, interference occurs in that measuring wave 13 as well as reference wave 14 are directed onto the same point of incidence 17. However, it is not necessary for reference wave 14 to also impinge on hologram 18. According to FIG. 2, it may therefore also be provided that reference wave 14 is caused to interfere with the measuring wave 13 diffracted by the hologram only directly ahead of the optical sensor arrangement 20. For example, reference wave 14 may be directed directly onto the sensor arrangement 20. A beam divider 24 may also be provided to combine the two waves 13 and 14.

The waves caused to interfere with one another reach the optical sensor arrangement 20 which includes at least two sensors 21 and 22. As a function of wave front differences caused by the hologram between measuring wave 13 and reference wave 14, different radiation intensities occur at the two sensors 21 and 22. In signal processing arrangement 23, the absolute, two-dimensional position is determined from the difference in intensity by way of a comparison with a value stored in a memory. For example, the signal processing arrangement 23 calculates the signal difference occurring at sensors 21 and 22 or it forms, for example, a ratio therefrom. Greater resolution and/or measuring accuracy is attained if more than two sensors 21 and 22 are included in sensor arrangement 20. Sensor arrangement 20 is configured, for example, as an array or a two-dimensional multi-sensor arrangement. In this case, a plurality of signals are available in signal processing arrangement 23 which can be utilized for the absolute position determination.

In another embodiment, the absolute position is determined from the phase difference occurring between sensors 21 and 22. A determination of the phase relationships in the optical frequency domain is avoided if either the measuring wave 13 or the reference wave 14 is frequency or phase modulated relative to the other. In the end result, phase and frequency modulation are the same. For this purpose, a modulator 16 is provided which, for example, correspondingly modulates the reference wave 14. The phase relationship between the signals put out by sensors 21 and 22 can be performed in signal processing arrangement 23 in the domain of the modulation frequency of modulator 16.

Evaluation of the phase information has the significant advantage over an evaluation of the intensities that intensity changes which could occur, for example, due to the optical components becoming soiled or, for example, due to aging phenomena, do not influence the position determination.

The complicated calculation of the hologram structure can be simplified if separate structures are predetermined for each one of the two directions to be determined in the position measurement. An evaluation of the different structures is possible by the use of two optical beams of different wavelengths.

According to a first modification of the apparatus according to the invention, two measuring waves 13 and reference waves 14 are provided, with sensor arrangement 20 including at least two sensors for the one wave and at least two sensors for receiving the radiation at the other wavelength. It is possible to have a completely separate structure for the two measuring arrangements 11 for the two wavelengths. Preferably, some parts of the measuring structure 11 are used simultaneously for both wavelengths. It is possible to guide both measuring beams 13 jointly at different wavelengths, with the reference beams 14 being directed at an angle of about 90 degrees with respect to the projections of the reference beams 14 onto surface 18 for the two measuring directions. It is also possible to divide the two measuring beams 13 for both measuring directions and to guide the reference beams 14 jointly. Radiation source 12 may either produce the beams at different wavelengths separately or jointly.

In a modification of measuring arrangement 11 employing two measuring waves 13 and two reference waves 14, the wavelength of measuring wave 13 and reference wave 14 is switched at predetermined time intervals. In a first time period, the wavelength is generated for position measurements in the one measuring direction and in a next time period the wavelength is generated for the position measurement in the other measuring direction. The particular advantage of this modification is that only two sensors 21 and 22 are required. The necessary separate evaluation at the different wavelengths is effected in signal processing arrangement 23 which receives a signal that indicates the present wavelengths of the measuring and reference waves.

The optical measuring arrangement 11 is preferably configured in integrated form, with at least the measuring wave 13 and the reference wave 14 being conducted through a light waveguide 15. Particularly suitable as the radiation source 12 is a semiconductor laser which enables measuring arrangement 11 to have a particularly compact structure.

Adjustment of the optical measuring arrangement 11 is limited essentially to causing the measuring wave 13 and reference wave 14 to interfere with one another. The angle of incidence of measuring wave 13 and possibly of reference wave 14 with respect to hologram 18, on the one hand, and the observation angle of sensor arrangement 20 with respect to hologram 18, on the other hand, are freely selectable within certain limits.

We claim:

1. An apparatus for making absolute two-dimensional measurements of the position of an object with reference to a measuring arrangement comprising: means for directing an optical measuring wave onto a surface of the object, with said surface being configured as a hologram; means providing an optical reference wave for interfering with the measuring wave diffracted by the hologram; an optical sensor arrangement comprising at least two sensors for detecting the interfered-with waves; and a signal processing arrangement which determines the position of the object from the output signals of the sensors and from a value stored in a memory.

2. An apparatus according to claim 1, wherein the signal processing arrangement determines the absolute position from sensor output signals which are proportional to the intensity of the interfered-with waves.

3. An apparatus according to claim 1, wherein a phase or frequency modulation is provided between the measuring wave and the reference wave, and wherein the signal processing arrangement determines the absolute position from the phase relationship between the output signals of the sensors.

4. An apparatus according to claim 1, wherein the measuring and reference waves are directed from different directions onto a common point of incidence on the hologram.

5. An apparatus according to claim 1, wherein the means providing an optical reference wave directs the reference wave to a location not on the surface of the object for interfering with the measuring wave after the measuring wave is diffracted at a point of incidence on the surface of the object.

6. An apparatus according to claim 1, including a semiconductor laser for generating the measuring wave and reference wave.

7. An apparatus according to claim 1, including an opto-acoustic modulator for modulating the measuring or reference wave.

8. An apparatus according to claim 1, wherein said optical sensor arrangement is a multisensor arrangement configured as an array.

9. An apparatus according to claim 1, wherein said optical sensor arrangement includes at least four optical sensors provided in a two-dimensional sensor arrangement.

10. An apparatus according to claim 1, wherein at least one further optical measuring wave is directed onto the surface of the object, with said surface being configured as a hologram and at least one further optical reference wave is provided for interfering with the measuring wave diffracted by the hologram, with the further measuring and reference wave having a different wavelength compared to the first measuring and reference wave and the measuring and reference wave at one wavelength is provided for the position measurement on the surface in one measuring direction and the measuring and reference wave at the other wavelength is provided for the position measurement on the surface in another measuring direction, preferably a direction rotated by 90°; and wherein said optical sensor arrangement includes at least two groups of at least two sensors, with each sensor group picking up a certain wavelength of the interfered-with waves.

11. An apparatus according to claim 1, wherein at least one further optical measuring wave is directed onto the surface of the object, with said surface being configured as a hologram and at least one further optical reference wave is provided for interfering with the measuring wave diffracted by the hologram, with the further measuring and reference wave having a different wavelength than the first measuring and reference wave, and with alternatingly measuring waves and reference waves exhibiting one wavelength and thereafter the other wavelength; and the measuring and reference wave of the one frequency is provided for the position measurement in one direction and the measuring and reference wave of the other wavelength is provided for the position measurement on the surface in another direction, and a signal which in each case indicates the existing wavelength of the measuring and reference wave is fed to the signal processing arrangement.

12. An apparatus according to claim 1, realized in integrated optical form.

13. A method for making absolute, two-dimensional measurements of the position of an object with reference to a measuring arrangement comprising the steps of: providing a surface of the object with a hologram containing absolute two-dimensional position information of the object; directing an optical measuring wave onto the surface of the object provided with the hologram; providing an optical reference wave and causing same to interfere with the measuring wave diffracted by the hologram; detecting the interfered-with waves with at least two sensors; and determining the position of the object by comparing a value derived from respective output signals of the sensors with a value stored in a memory.

14. A method according to claim 13, wherein the step of determining includes determining the absolute position from sensor output signals which are proportional to the intensity of the interfered-with waves.

15. A method according to claim 13, further comprising the step of providing a phase or frequency modulation between the measuring wave and the reference wave; and wherein the step of determining includes determining the absolute position using a value corresponding to the phase relationship between the output signals of the sensors.

* * * * *